March 16, 1937.  E. S. TAYLOR  2,074,134
THRUST MOTOR
Filed June 5, 1935  2 Sheets-Sheet 2
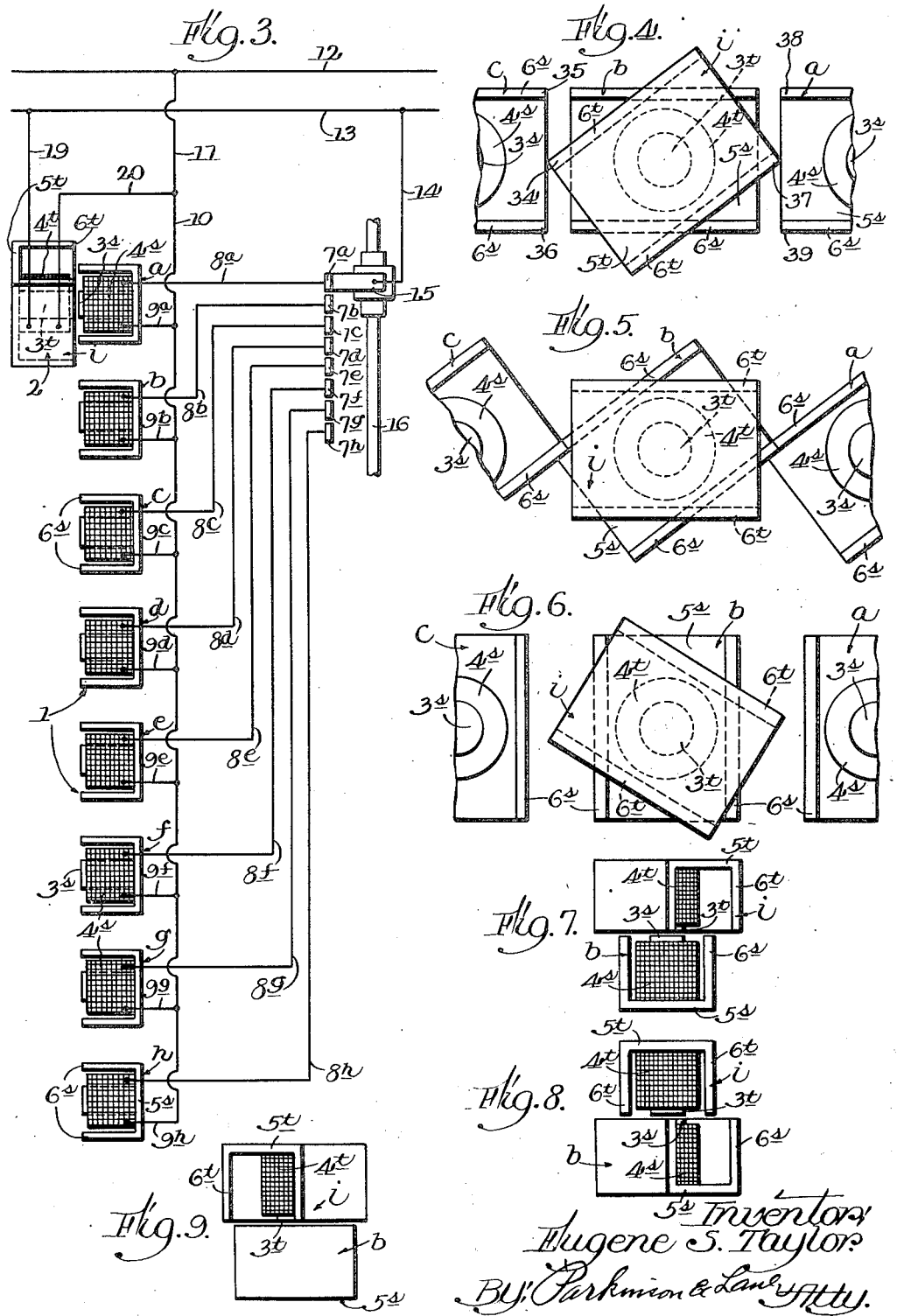
Inventor
Eugene S. Taylor
By Parkinson & Lane Atty.

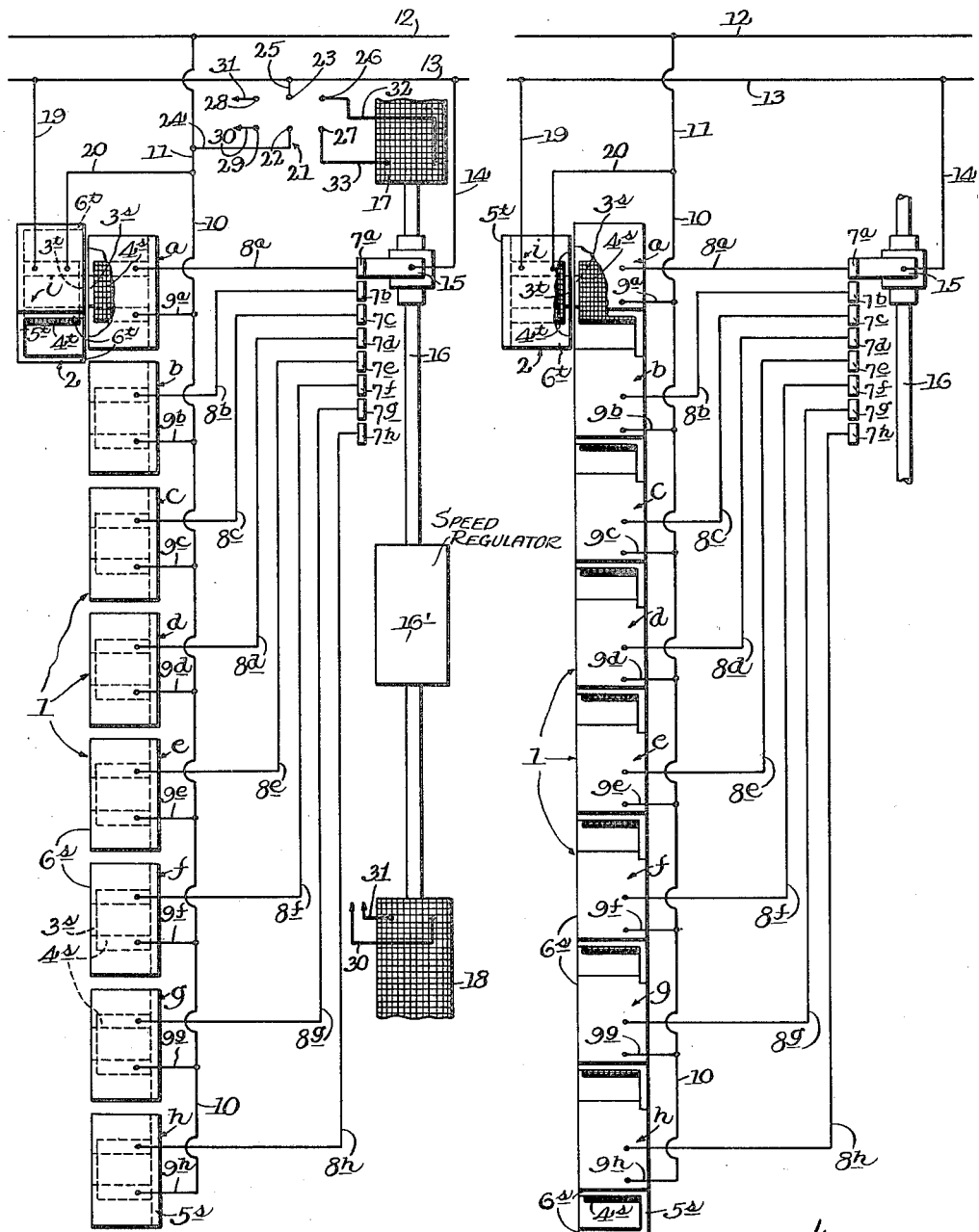

Patented Mar. 16, 1937

2,074,134

UNITED STATES PATENT OFFICE 2,074,134

THRUST MOTOR

Eugene S. Taylor, Chicago, Ill.

Application June 5, 1935, Serial No. 25,018

8 Claims. (Cl. 172—290)

The present invention relates to electrical devices for moving loads, or for doing work, such as operating automobile parking devices, door operating devices, etc., and more particularly to a thrust motor for moving loads in any desired path whether rectilinearly, curvilinearly, or circularly. The term "thrust" is used herein in its generic sense and comprehends the idea of a force or stress acting or existing between bodies to effect a change of the relation of the bodies whether the result or effect be regarded as a push or pull, the term not being limited in its meaning to a push.

Among the objects of the invention is to provide a novel load moving means, such as a thrust motor comprising a stator, a load mover or translator, and circuit control means with circuits for controllably energizing the same.

In the embodiments selected to illustrate the invention the stator comprises a series of poles and coils or solenoids so wound that all the corresponding stator poles will have the same polarity throughout the series, that is, all the main poles will have the same polarity and all the auxiliary poles will have the same polarity but opposite to the polarity of the main poles. The translator may comprise one or more poles with one or more coils or solenoids so wound as to give a polarity to the main pole or poles opposite to that of the main poles of the stator and a polarity to the auxiliary poles thereof opposite to that of the auxiliary poles of the stator. The poles and coils of the stator and the translator constitute the energizing elements of the motor and while the illustrative embodiments selected to illustrate the invention are shown with a series of an indefinite number of stator elements and the translator as having but one or more elements it is to be understood that the invention comprehends the converse whereby the translator may comprise a series of an indefinite number of elements and the stator having but one or more elements. Moreover, while the motor is shown with the elements arranged in a rectilinear series it is to be understood that the invention comprehends any form of series whether it be curvilinear, circular or otherwise.

The circuit control means comprises a series of circuits and a series of circuit closing contacts or elements arranged in correspondence with the poles and coils of the series of elements of the motor and are so connected as to successively energize the poles and coils of the series in either direction of the series thereof, and a circuit closing means, such as a sliding member, for successively contacting the circuit closing contacts so as to close and open the circuits successively as stated above. The sliding member is such that it will contact a succeeding and a preceding contact of the series of contacts so as to close a succeeding circuit to energize a succeeding coil of the series of elements before it will open the preceding circuit to de-energize the preceding coil of the series of elements.

Another object of the invention is to provide a novel energizing element of the motor preferably having a main pole and auxiliary poles so arranged and disposed that the poles of the element or elements of the translator will bear an angular relation to the arrangement and disposition of the poles of the element or elements of the stator so that as relative movement occurs between the translator and the stator the flux field or fields of the one will act or react with the flux field or fields of the other in an efficient manner whereby there will be an absolutely smooth and even movement of the one relative to the other.

A further object of the invention is to provide a novel energizing element for the motor, the element preferably comprising a main pole and auxiliary poles, with an energizing coil on the main pole which may be located between the auxiliary poles. The main pole may be circular, non-circular, polygonal, or the like in cross-sectional area, and the auxiliary poles are preferably elongated and may be straight, curved or angular as desired, and preferably are disposed in spaced relation on opposite sides of the main pole, and generally more or less in parallelism. More specifically the element may comprise a U-shaped or channel shaped member the legs of which may constitute the auxiliary poles of the element, with the main pole between the legs and having an energizing coil thereon although the energizing coil may be held by the auxiliary poles.

Another object of the invention is to provide a novel thrust motor which will act as a thrust brake. When a stator pole is so energized or two adjacent poles are so energized as to stress the translator pole, or conversely, as to hold the translator pole opposite the energized stator pole or between the energized adjacent stator poles, or conversely, any tendency of the load to cause the translator to move will be counteracted by the the stress of the energized stator pole or poles acting on the translator pole or poles. Thus the stress of the energized stator pole or poles acts to hold the translator still and hence the load, and also to prevent over-run of the load when the translator has moved the load to the limit of movement by a counter thrust or braking effect on the translator.

A further object of the invention is to provide a novel thrust motor which is capable of operating in either direction without any reversal of electrical current in either the stator or translator coils, but by merely reversing the order of closing the circuits for the successive energizing of the stator or translator coils as the case may be depending upon when the stator or the translator comprises the series of indefinite number of elements. In other words, the coils of the series of elements are successively energized in either one or the other direction of the series of the elements but the passage of the electrical current through the coils when energized is always the same. When the stator comprises the series of indefinite number of elements, the translator coil or coils is or are constantly energized. When the translator comprises the series of indefinite number of elements, the stator coil or coils is or are constantly energized.

Another object of the invention is to provide a novel control device for the circuits of the thrust motor of the present invention, the circuit control means being independently operated at any predetermined or given rate of successive closing or opening of the circuits which in turn controls the rate of moving the load by the thrust motor. In some cases it may be desirable to move the load at a given rate, and to return the translator, for acting on the next load, at another rate.

Other objects, capabilities, advantages, features and the like are comprehended by the invention as will later appear and as are inherently possessed by the invention.

Referring to the drawings;

Figs. 1, 2 and 3 are schematic views of three illustrative arrangements of the elements of the motor and the control means therefor;

Figs. 4, 5 and 6 are schematic views of the relation of the elements of the translator and stator of the motors shown in Figs. 1, 2 and 3, respectively; and, Figs. 7, 8 and 9 are end views of the same respectively.

Referring more in detail to the drawings, the embodiments selected to illustrate the invention are shown as rectilinear motors with a row or series of energizing elements which may constitute the stator if this part of the motor is to remain in fixed or stationary position or constitute the translator if this part of the motor is to be the mover or actuator of the load, and one or more energizing element or elements in adjacency which may constitute the translator if this part of the motor is to be the mover or actuator of the load or constitute the stator if this part of the motor is to remain in fixed or stationary position.

Referring more particularly to Fig. 1 of the drawings the motor therein shown comprises a series of energizing elements 1 which in the illustrative case constitute the stator of the motor. In adjacency therewith and capable of moving linearly in parallelism therewith is shown an energizing element 2 which in the illustrative case constitutes the translator. Any suitable means (not shown) may be used to support these elements in their fixed or movable positions, and any suitable means (not shown) may be connected to the translator to move the load.

All the elements are alike and each comprises a main pole $3^s$ (stator pole) or $3^t$ (translator pole) carrying an energizing coil or solenoid $4^s$ (stator coil) or $4^t$ (translator coil), and a U-shape or channel shaped member having a base $5^s$ (stator) or $5^t$ (translator) and legs or wings $6^s$ (stator) or $6^t$ (translator) constituting auxiliary poles for the element.

The coils are so wound that all main poles $3^s$ will be of the same polarity and the main pole $3^t$ will be of opposite polarity to the main poles $3^s$.

All the auxiliary poles $6^s$ will be of the same polarity but of opposite polarity to the main poles $3^s$ and of the same polarity as the main pole $3^t$, whereas the auxiliary poles $6^t$ are of the same polarity but of opposite polarity to the main pole $3^t$ and the auxiliary poles $6^s$. As for example, when using direct current, if the main poles $3^s$ are of polarity N the main pole $3^t$ is of polarity S, the auxiliary poles $6^s$ are of polarity S, and the auxiliary poles $6^t$ are of polarity N, and vice versa.

Either type, direct or alternating, current of electricity may be used as desired. When using alternating current, the coils of the stator and of the translator are so wound that the polarity of the translator main pole and the translator auxiliary poles will be of opposite polarity to that of the stator main poles and of the stator auxiliary poles respectively as the polarities change in accordance with the cycles of the current used.

The stator elements are arranged in a series of any desired number, the illustrative embodiment being shown with eight, merely by way of example, and which are designated $a$, $b$, $c$, $d$, $e$, $f$, $g$ and $h$, and the translator is shown with but one element which is designated $i$. Corresponding with the stator elements is a series of contacts $7^a$, $7^b$, $7^c$, $7^d$, $7^e$, $7^f$, $7^g$ and $7^h$ each correspondingly connected to the elements $a$—$h$ by way of circuit conductors $8^a$, $8^b$, $8^c$, $8^d$, $8^e$, $8^f$, $8^g$ and $8^h$ leading to the corresponding coils $4^s$ of the elements $a$, $b$, $c$, $d$, $e$, $f$, $g$ and $h$ respectively. From the coils $4^s$ respectively lead the circuit conductors $9^a$, $9^b$, $9^c$, $9^d$, $9^e$, $9^f$, $9^g$ and $9^h$ which are all connected to a bus 10 connected to a common conductor 11 leading to and connected with a main conductor 12. To the other main conductor 13 is connected a conductor 14 leading to and connected with a sliding contact or blade 15 adapted to slidably contact the contacts $7^a$—$7^h$ successively in either direction of movement. The contact or blade 15 is carried by a shaft or rod 16 adapted to move axially by solenoids 17 acting on suitable cores within the solenoids and carried by the shaft or rod 16. These solenoids 17 and 18 are so constructed and arranged as to move the shaft or rod 16 in either direction as desired and as controlled by a switch later described. Any suitable means 16' may be connected to the shaft 16 to govern its rate of movement in either direction of movement of the shaft.

The translator coil $4^t$ is constantly energized by way of a conductor 19 connected to the main 13 and a conductor 20 connected to the bus 10.

The solenoids 17 and 18 are energized by way of a switch 21 which may be of the double pole double throw type. The mid poles 22 and 23 are connected to the mains 12 and 13 by way of conductors 24 and 25 respectively the blade engaging poles 26 and 27 are connected to the solenoid 17 by way of conductors 32 and 33, and the blade engaging poles 28 and 29 are connected to the solenoid 18 by way of the conductors 30 and 31. The operation of this switch for the energizing of the solenoid 17 or the solenoid 18, as the case may be, for opposite movements of the shaft 16 is deemed obvious.

It will be noted that the elements $a$—$i$ of the motor are of generally rectangular shape or form. In the embodiment shown in Figs. 1, 4 and 7 the stator elements $a$—$h$ are in longitudinal alinement so that the elongated auxiliary poles $6^s$ are all parallel to the center line of the series, but the translator element $i$ is disposed at an angle to such center line, so that the auxiliary poles $6^t$ cross or are at an angle to the auxiliary poles $6^s$. The purpose of this is to improve the action of the flux fields between the translator and stator elements. Referring to Fig. 4 and assuming the translator element to be moving to the left toward the stator $c$, the corner portion 34 of the translator element $i$ is moving into the angular space between the flux streams extending from the main pole $3^s$ to the corner portions 35 and 36 of the auxiliary poles $6^s$ whereby the flux stream from the pole $3^t$ to the corner portion 34 of the auxiliary pole $6^t$ joins with the above mentioned flux streams from main pole $3^s$ to the corner portions 35 and 36. While this movement is occurring the element $b$ has been de-energized and the element $c$ energized so that there is an attraction stress between the poles $3^s$ of element $c$ and $3^t$ of element $i$ as also an attraction stress between the auxiliary poles $6^s$ of the element $c$ and the auxiliary poles $6^t$ of the element $i$. This latter stress so varies with the relative movement of the stator and translator elements as to provide a perfectly smooth and even transition of the translator element along the stator elements. When the translator element $i$ centers with the stator element $c$ (as for example), that is, when the poles $3^s$ and $3^t$ are alined, the element $c$ is de-energized and the next succeeding element, such as element $d$, is energized. This action or movement proceeds to the extent desired or to the end of the series of the stator elements, at which time the action or movement may be stopped by opening the switch 21 to de-energize the solenoid moving the shaft, and if it be desired to effect reverse movement of the translator, the switch is closed on the opposite side to energize the other solenoid for moving the shaft in the opposite direction so as to cause the translator element $i$ (Fig. 4) to move to the right. Instead of opening the switch when the blade 15 has reached the end of its course, it may be left closed to maintain the element at the end of the series energized whereby the element will act as a holding means or as a brake.

When the translator moves, as to the right as shown in Fig. 4, the corner portion 37 will enter the space between the flux streams (as for example) from the pole $3^s$ of element $a$ to the corner portions 38 and 39 of the auxiliary poles $6^s$ of the element $a$ thus causing a joining of the flux stream from the pole $3^t$ of element $i$ to the corner portion 37 with the above mentioned flux streams from pole $3^s$ to corner portions 38 and 39 of element $a$, the element $b$ having been de-energized.

It will be understood that as the blade 15 is caused to move successively over or along the contacts $7^a$—$7^h$, or vice versa, the circuits to the stator elements $a$—$h$ are successively closed and the stator elements $a$—$h$ are successively energized, and vice versa, so as to draw and cause a movement of the translator element $i$ along the series of the stator elements, and vice versa. As the blade 15 moves from one contact to another of the series $7^a$—$7^h$ it wipes a succeeding contact before leaving the preceding contact so that a succeeding stator element is energized before the preceding stator element is de-energized. This assists in the smooth and even movement of the translator.

The embodiment shown in Figs. 2, 5 and 8 is the same in details as the embodiment shown in Figs. 1, 4 and 7, (the same reference characters being used) with the exception that the stator elements are arranged on an angle to the center line of the row or series (Fig. 5) and the translator is disposed with its auxiliary poles $6^t$ (Fig. 5) parallel to such center line. In this case the corner portions of the angularly disposed stator elements enter the space between the flux streams from the main pole $3^t$ to the corner portions of the auxiliary poles $6^t$ of the translator element (Figs. 5 and 8). The relationship of the stator with the translator elements of this embodiment is the converse of that of the stator with the translator elements of the embodiment shown in Figs. 1, 4 and 7.

The embodiment shown in Figs. 3, 6 and 9 is the same in details as the embodiments shown in Figs. 1, 4 and 7 and in Figs. 2, 5 and 8 (the same reference characters being used) with the exception that the stator elements are arranged at right angles to the center line of the row or series (Fig. 6) and with all the auxiliary poles $6^s$ in parallelism, and the translator with its auxiliary poles $6^t$ are disposed at an angle to such center line (Fig. 6). In this case the corner portions of the translator element enter the flux stream from the stator main pole $3^s$ to the auxiliary pole $6^s$ in the midst of such stream. Since the polarity of the translator auxiliary pole $6^t$, the corner of which is entering such stream, is opposite to that of the auxiliary pole $6^s$ nearest such corner the attraction stress is such as to cause a smooth and even movement of the translator element.

It is to be understood that while the embodiments chosen to illustrate the invention are disclosed with the series of indefinite number of elements $a$—$h$ acting as the stator and the element $i$ acting as the translator, it is to be understood the converse is comprehended by the invention, whereby the element $i$ is held fixed or stationary, and the series of elements $a$—$h$ is moved to act upon the load.

Irrespective of the direction of movement of the translator part of the motor, it will be noted that the energizing of the coils of the series is always effected in the same way, that is, with the same direction of current flow. There is no reversal of the current in any part of the motor.

While I have herein described and upon the drawings shown a few illustrative embodiments of the invention, it is to be understood that the invention is not limited thereto but comprehends other constructions, arrangements of parts, details, features and the like without departing from the spirit of the invention.

Having thus disclosed the invention,

I claim:

1. A thrust motor comprising relatively movable members co-acting by electromagnetic stresses set up in each member, said members comprising electromagnetic elements so arranged that an element of a member is opposite to an element of the other member for mutual co-action, all elements being alike in construction, each element comprising a magnetizable core having spaced poles in the same plane, an energizing coil on a portion of said core and being so wound as to give one of said poles a given polarity and another of said poles an opposite polarity, the planes of the poles of the elements of said members being parallel and adjacent to each other, certain of said poles of said elements in said members being elongated and in said planes, said elongated poles being so disposed that the elongated poles of the element of one member are at an angle to the elongated poles of the element of the other member.

2. A thrust motor comprising relatively movable members co-acting by electromagnetic stresses set up in each member, said members comprising electromagnetic elements so arranged that an element of a member is opposite to an element of the other member for mutual co-action, all elements being alike in construction, each element comprising a magnetizable core having spaced poles in the same plane, an energizing coil on a portion of said core and being so wound as to give one of said poles a given polarity and another of said poles an opposite polarity, the planes of the poles of the elements of said members being parallel and adjacent to each other, certain of said poles of said elements in said members being elongated and in said planes, said elongated poles being so disposed that the elongated poles of the element of one member are at an angle to the elongated poles of the element of the other member, the elongated poles of the element of the one member being of opposite polarity to the polarity of the corresponding elongated poles of the element of the other member.

3. A thrust motor comprising relatively movable members co-acting by magnetic stresses, said members having magnetic elements, each element having spaced poles in the same plane, one of said poles being elongated in said plane, said poles being of opposite polarity, the corresponding poles of the element of the one member being of such a polarity with respect to the polarity of the poles of the element of the other member as to cause relative movement of said members, said members being so disposed as to have the plane of the poles of the element of the one member parallel to the plane of the poles of the element of the other member, the elongated pole of the element of the one member being at an angle to the elongated pole of the element of the other member, means for energizing the poles of an element with given polarities, means for supporting the members in their relatively movable positions, and means for controlling the direction of relative movement of said members.

4. A thrust motor comprising relatively movable members co-acting by electro-magnetic stresses set up in said members, said members having electro-magnetic elements, each of said elements having a magnetizable core having spaced poles in the same plane, energizing means for giving opposite polarities to said poles, the poles of the elements of said members being disposed in parallel planes, a pole of each element being elongated, the elongated pole of the element of the one member being at an angle with the elongated pole of the element of the other member, the energizing means of the elements of said members having separate and independent exciting circuits, the corresponding poles of the elements of the one member being of such a polarity with respect to the polarity of the poles of the element of the other member as to cause relative movement of said members, means for supporting the members in their relatively movable positions, and means for controlling the direction of relative movement of said members.

5. A thrust motor comprising relatively movable members, said members having magnetic elements having elongated poles disposed in parallel planes, said elongated poles being at an angle to each other, and means for energizing a pole of the element of the one member with such a polarity as to magnetically stress the corresponding pole of the element of the other member for causing a relative movement of said members.

6. A thrust motor comprising relatively movable members co-acting by electro-magnetic stresses set up in each member, said members comprising electro-magnetic elements having spaced magnetic poles of opposite polarities and disposed in the same plane, the corresponding poles of the elements of said members being of the same form and magnitude, and so arranged as to be opposite each other for mutual co-action, each element comprising a magnetizable core having said spaced poles in the same plane, an energizing coil on a portion of said core and being so wound as to give one of said poles a given polarity and another of said poles an opposite polarity, the planes of the poles of the elements of said members being parallel and adjacent to each other, the corresponding poles of the element of the one member being of such a polarity with respect to the poles of the element of the other member as to cause relative movement of said members, means for energizing the poles of said elements, the energizing means of the elements of said members having separate and independent exciting circuits, means for supporting the members in their relatively movable positions, and means for controlling the direction of relative movement of said members.

7. A thrust motor comprising relatively movable members co-acting by magnetic stresses; said members having magnetic elements, each element having spaced poles of opposite polarities and disposed in the same plane, the corresponding poles of the elements of said members being of the same form and magnitude and so arranged as to be opposite each other for mutual co-action, the corresponding poles of the element of the one member being of such a polarity with respect to the polarity of the poles of the element of the other member as to cause relative movement of said members, said members being so disposed as to have the plane of the poles of the element of the one member parallel to the plane of the poles of the element of the other member, means for energizing the poles of an element with given polarities, means for supporting the members in their relatively movable positions, and means for controlling the direction of relative movement of said members.

8. A thrust motor comprising relatively movable members, one of said members having a magnetic element having elongated poles disposed in a plane, the other member having a plurality of elements each having elongated poles disposed in a plane parallel to said first mentioned plane, the elongated poles of the element of said one member being of a given polarity, the elongated poles of the elements of the other member all being of a given polarity and of such a polarity with respect to the polarity of the poles of the element of the one member as to cause relative movement of said members, the elongated poles of the element of the one member being at an angle to the elongated poles of the elements of the other member, means for serially energizing and de-energizing the poles of the elements of the other member, and separate means for energizing the poles of the element of the one member.

EUGENE S. TAYLOR.